United States Patent
Xie et al.

(10) Patent No.: US 6,666,535 B2
(45) Date of Patent: Dec. 23, 2003

(54) METHOD AND APPARATUS FOR PREVENTING SATELLITE INDUCED BANDING BY SELECTIVE PIXEL COMPENSATION

(75) Inventors: Yonglin Xie, Fairport, NY (US); Roger G. Markham, Webster, NY (US)

(73) Assignee: Xerox Corporation, Stamford, CT (US)

( * ) Notice: Subject to any disclaimer, the term of this patent is extended or adjusted under 35 U.S.C. 154(b) by 143 days.

(21) Appl. No.: 10/046,150

(22) Filed: Jan. 16, 2002

(65) Prior Publication Data
US 2003/0132975 A1 Jul. 17, 2003

(51) Int. Cl.[7] .............................. G06F 3/12; B41J 2/485; B41J 2/51
(52) U.S. Cl. ............................ 347/5; 358/1.1
(58) Field of Search ................... 347/5, 9, 14; 358/1.1, 358/1.2, 1.8

(56) References Cited

U.S. PATENT DOCUMENTS 5,369,428 A * 11/1994 Maze et al. .................... 347/5

* cited by examiner

Primary Examiner—Huan Huu Tran
(74) Attorney, Agent, or Firm—Oliff & Berridge, PLC

(57) ABSTRACT

A method and apparatus prevents satellite induced banding caused in bi-directional printing in which a print head alternatively moves in a first printing direction and in a second printing direction opposite to the first printing direction. The ink jet printer includes a controller that performs at least one of (i) selectively removing pixels in the first printing direction in order to lighten an image, and (ii) selectively adding pixels in the second printing direction in order to darken the image.

21 Claims, 12 Drawing Sheets

METHOD AND APPARATUS FOR PREVENTING SATELLITE INDUCED BANDING BY SELECTIVE PIXEL COMPENSATION

BACKGROUND OF THE INVENTION

1. Field of Invention

This invention relates to ink jet printers, and more particularly to method and apparatus for preventing banding defects caused by satellite drops ejected by a print head.

2. Description of Related Art

When a main drop of an ink drop is ejected at a speed greater than certain values (e.g., approximately 5 m/sec), the main drop is accompanied by one or more small sub-drops called satellite drops.

Satellite drops are usually smaller than the main drop and travel at a lower speed than the main drop. As a result, satellite drops can land on different locations of the image receiving member (e.g., a sheet of paper) relative to the main drop during printing when the drop ejector and the image receiving member are moving relative to each other. Another factor that can cause satellite drops to land at different locations than the main drop is that satellite drops generally have a velocity vector that is slightly different from that of the main drop. This satellite drop misplacement can increase or decrease with increasing print head speeds and with an increased gap between the print head and the image receiving member.

Because satellite drops occasionally travel in slightly different directions relative to the main drop, the effect of satellite drops on the image quality can differ based on a traveling direction of the print head. In one example of a conventional printer, the print head transfers ink onto the image receiving member as the print head travels from right-to-left and left-to-right relative to the image receiving member, i.e., a bi-directional printer. Furthermore, while in a stationary position, the nozzles of this print head create satellite drops having velocity vectors which direct satellite drops to land slightly to the left of a main drop on the image receiving member.

As the print head passes from right-to-left and transfers ink onto the image receiving member, the velocity vector of the print head in conjunction with the velocity vectors of the satellite drops cause the satellite drops to land farther away from the main drop on the image receiving member relative to that of the satellite drops of the print head when stationary. In other words, the satellite drops will lag even farther behind the main drop due to the additional print head velocity vector.

On a return swath, as this print head moves from left-to-right and transfers ink onto the image receiving member, the velocity of the print head causes the satellite drops to land closer to, or possibly within, the main drop on the image receiving member. The differing positions of the satellite drops relative to the main drop cause variations in the appearance between swaths formed by a left-to-right pass versus swaths formed by a right-to-left pass. Accordingly, this effect causes bi-directional banding in the final image because the patterns formed by drops printed in one direction are different from those printed in the other direction. In particular, the percentage coverage of the recording medium will differ depending on the swath direction.

SUMMARY OF THE INVENTION

The invention addresses the problems set forth above. Aspects of this invention relate to method and apparatus for preventing image defects caused by satellite induced banding in a single pass bidirectional ink jet printer.

According to one aspect of the invention, a method and apparatus prevents satellite induced banding caused in bidirectional printing in which a print head alternatively moves in a first printing direction and in a second printing direction opposite to the first printing direction. The ink jet printer includes a controller that performs at least one of (i) selectively removing pixels in the first printing direction in order to lighten an image, and (ii) selectively adding pixels in the second printing direction in order to darken the image.

These and other features and advantages of this invention are described in or are apparent from the following detailed description of various exemplary embodiments.

BRIEF DESCRIPTION OF THE DRAWINGS

Various exemplary embodiments of the invention will be described in detail, with reference to the following figures, wherein.

DETAILED DESCRIPTION OF EXEMPLARY EMBODIMENTS

Figure 1:
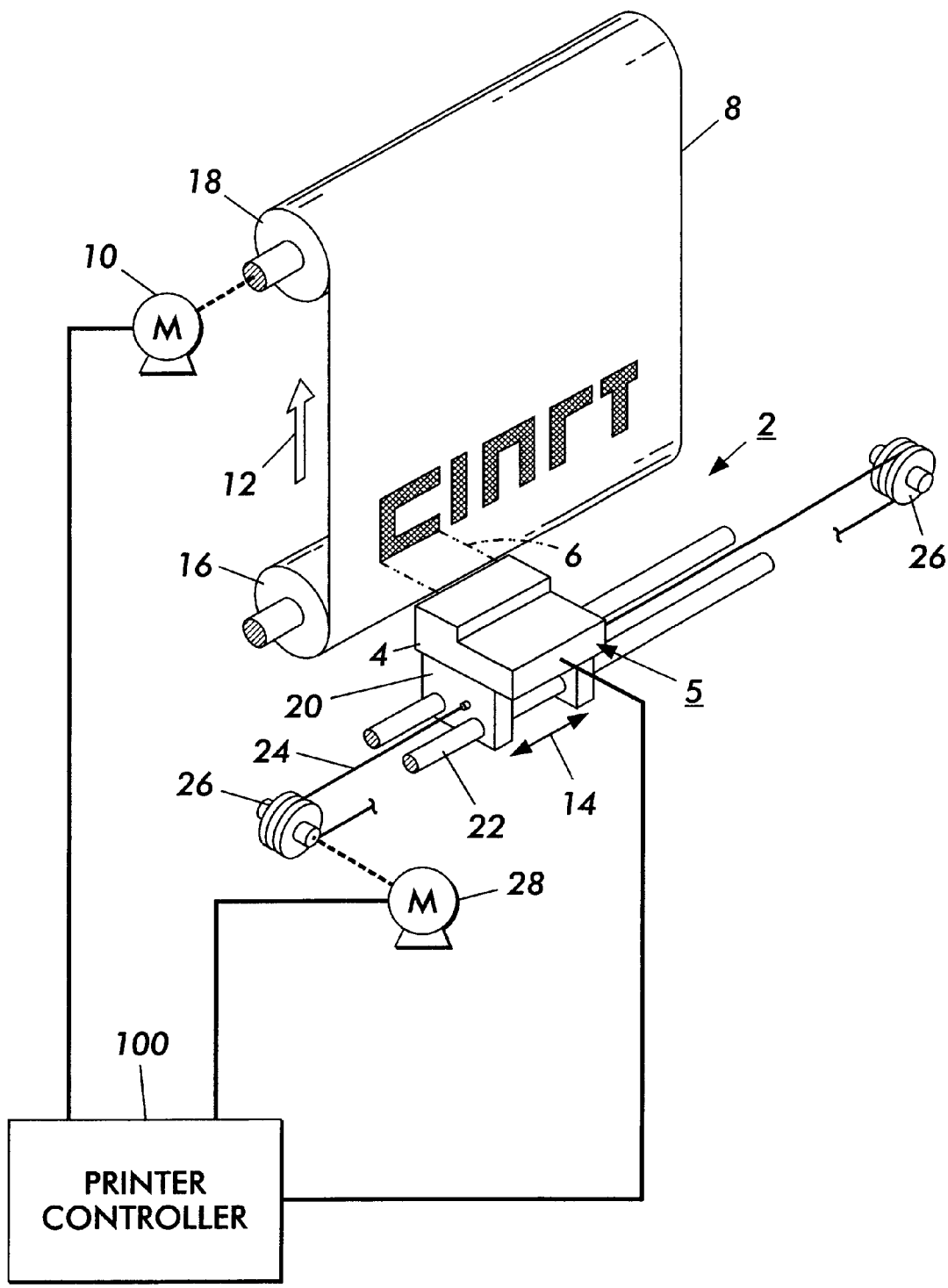
FIG. 1 is a schematic view of a printing system in accordance with one embodiment of the invention.

FIG. 1 shows an exemplary carriage-type ink jet printing device 2. A vertically linear array of droplet producing channels is housed in the print head 4 of a reciprocal carriage assembly 5. Ink droplets are propelled to a recording medium 8, such as a sheet of paper, that is stepped by a motor 10 a preselected distance (often equal to the length of the array) in a direction of arrow 12 each time the print head 4 traverses across the recording medium 8 in the directions indicated by arrow 14. The recording medium 8 can be stored on a supply roll 16 and stepped onto takeup roll 18 by stepper motor 10 or other structures, apparatus or devices. Of course, structure can be provided that feeds sheets of paper rather than a roll of paper.

The print head 4 is fixedly mounted on the support base 20, which is adapted for reciprocal movement using any structure, apparatus or device, such as, e.g., two parallel guide rails 22. The reciprocal movement of the print head 4 may be achieved by a cable 24 and a pair of pulleys 26, one of which is powered by a reversible motor 28. The print head 4 is generally moved across the recording medium 8 perpendicularly to the direction in which the receiving member 8 is moved by the motor 10. Of course, other structures for reciprocating the carriage assembly 5 are possible.

The ink jet printing device 2 is operated under the control of a printer controller 100. The printer controller 100 transmits commands to the motors 10 and 28 and the print head 4 to produce an image on the image recording medium 8. Furthermore, the printer controller 100 receives information from the various components of the ink jet printing device 2. For example, the printer controller 100 receives measurements of ink temperature from a temperature sensor located in print head 4.

Figure 2:
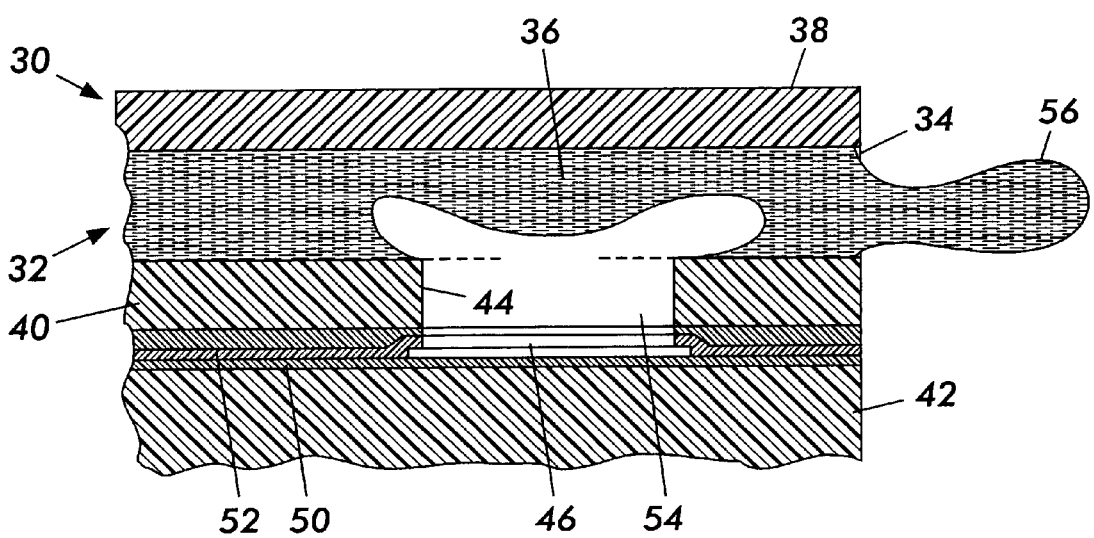
FIG. 2 is a cross-sectional view of a single ejector channel for an ink jet print head.

FIG. 2 shows one exemplary embodiment of an ink droplet emitter, or ejector 30, of the ink jet print head 4. Various types of ink jets can be implemented, including but not limited to, piezo ink jets, acoustic ink jets, and any other type of ink jet device. According to FIG. 2, the ink droplet ejector 30 is one of a large plurality of such emitters found in a typical ink jet print head. While FIG. 2 shows a side-shooter emitter, other types of emitters such as roof-shooter emitters may similarly be used with this invention. Typically, such emitters are sized and arranged in linear arrays of 300 to 600 emitters per inch, although other arrangements are possible. A silicon member having a plurality of channels for ink droplet emission is known as a "die module" or "chip". Each die module typically comprises hundreds of emitters, spaced 300 or more to the inch. An ink jet print head may have one or more die modules extending the effective size of the array. In print heads with multiple die modules, each die module may include its own ink supply manifold, or multiple die modules may share a common ink supply manifold.

Each emitter 30 includes a capillary channel 32 terminating in an orifice or nozzle 34. The channel 32 holds a quantity of ink 36 maintained within the capillary channel 32 until such time as a droplet of ink is to be emitted. Each capillary channel 32 is connected to a supply of ink from an ink supply manifold (not shown). The upper substrate 38 abuts a thick film layer 40, which in turn abuts a lower substrate 42.

Sandwiched between the thick-film layer 40 and the lower substrate 42 are electrical heating elements 46 used to eject ink droplets from the capillary channel 32 in a well-known manner. The heating elements 46 may be located within a recess 44 formed by an opening in the thick film layer 40. Each heating element 46 is directly or indirectly electrically connected to an addressing electrode 50. Each of the ejectors 30 in the print head 4 may have its own heating element 46 and an individual addressing electrode 50. The addressing electrode 50 may be protected by a passivation layer 52. Each addressing electrode 50 and corresponding heating element 46 may be selectively controlled by control circuitry. Other ink jet print head architectures are also within the scope of this invention.

As is well known in the art, when a print pulse is applied to the addressing electrode 50, the heating element 46 is energized. The print pulse is a signal that is of a sufficient magnitude and/or duration so that the heat from the resistive heating element 46 will cause the liquid ink immediately adjacent to the heating element 46 to vaporize, creating a bubble 54 of vaporized ink. The force of the expanding bubble 54 ejects an ink droplet 56, which may include a main droplet and smaller satellite drops, from the nozzle 34 onto the surface of the recording medium 8.

Furthermore, under the control of the printer controller 100, thermal ink jet print heads may apply a plurality of pre-pulses to the heating element 46 prior to ejecting each ink droplet 56. Typically, one or more pre-pulses may be applied by the heating element 46 prior to a print pulse in order to warm the ink prior to ejection. The amount and timing of the pre-pulse can vary as a function of the temperature of the ink.

Figure 3:
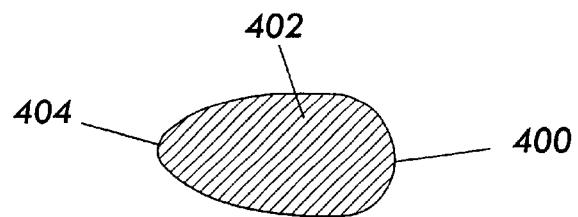
FIGS. 3–5 are exemplary spot patterns formed on a receiving member.
Figure 4:
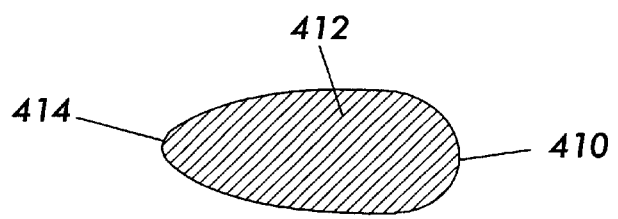
Figure 5:
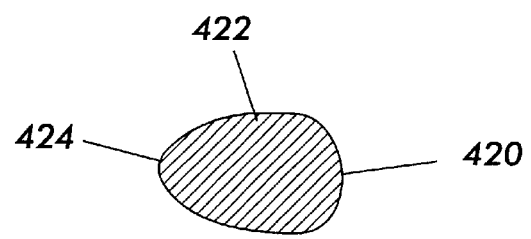

FIGS. 3, 4 and 5 show three different spot patterns 400, 410 and 420 formed by a typical nozzle 34 of a print head 4. For simplicity of explanation, each of the spot patterns 400, 410 and 420 includes a main spot portion 402, 412 and 422, respectively, and a satellite spot portion 404, 414 and 424, respectively. As described above, the spot portions 402, 412 and 422 describe where the majority of ink ejected from the nozzle 34 lands upon the image recording medium 8. The satellite spot portions 404, 414 and 424 are portions of the ink spots formed by satellite drops having slightly different velocity vectors than the main drops that form the main spot portions 402, 412 and 422. As a result, the satellite spot portions 404, 414 and 424 land upon the recording medium 8 at slightly different positions from the main spot portions 402, 412 and 422. The farther the satellite drop lands away from the main spot portions 402, 412 and 422, the more elongated the spot patterns 400, 410 and 420 become.

Various factors can contribute to the misdirection of satellite drops. For example, a satellite drop will fall on one side of a main drop and not the other because of the asymmetry in the ink droplet ejector 30. Asymmetries may be a result of a plurality of factors, such as for example, the heating element 46 being located on one side of the ink droplet ejector 30, the capillary channel 32, being asymmetric, asymmetric propagation in the face of the ink droplet ejector 30, and the carriage speed of the print head 4.

FIG. 3 shows a spot pattern 400 formed by a nozzle 34 that is held in a stationary position relative to the image recording medium 8. As shown in FIG. 3, the satellite spot portion 404 is positioned slightly to the left of the main spot portion 402 on the image recording medium 8. This is because the velocity vector of the satellite drop as it is ejected from the nozzle 34 is slightly different from the velocity vector of the main drop. As a result, as the ink is ejected from the nozzle 34 and travels towards the image recording medium 8, the satellite drop travels slightly to the left in accordance with the difference in the velocity vectors.

FIG. 4 shows a spot pattern 410 formed by a nozzle 34 of the print head 4, as the print head 4 travels from left-to-right relative to the image recording medium 8. As shown in FIG. 4, the satellite spot portion 414 now extends a greater distance to the left relative to the satellite spot portion 404 of FIG. 3. The "stretching" of the spot pattern 410 is due to the additional velocity vector imparted to the satellite drop by the print head 4 traveling in a left-to-right direction relative to the image recording medium 8. In other words, as the print head 4 travels from left-to-right, the difference between the velocity vectors of the main drop and the satellite drop increases. The overall effect of the increased difference in the velocity vectors is to increase the distance between the landing positions of the satellite drop forming the satellite spot portion 414 and the main drop forming the main spot portion 412.

FIG. 5 shows a spot pattern 420 formed by the same print head 4 moving in a right-to-left direction relative to the image receiving member 8. As shown in FIG. 5, the satellite spot portion 424 of the spot pattern 420 is positioned relatively closer to the main spot portion 422 relative to the spot pattern 400. The "compression" of the spot pattern 420 is due to the velocity of the print head 4 when moving in the right-to-left direction decreasing the difference between the velocity vectors of the main drop and the satellite drop. In other words, the satellite drop forming the satellite spot portion 424 now lands in a position closer to that of the main drop forming the main spot portion 422 on the image recording medium 8.

Figure 6:
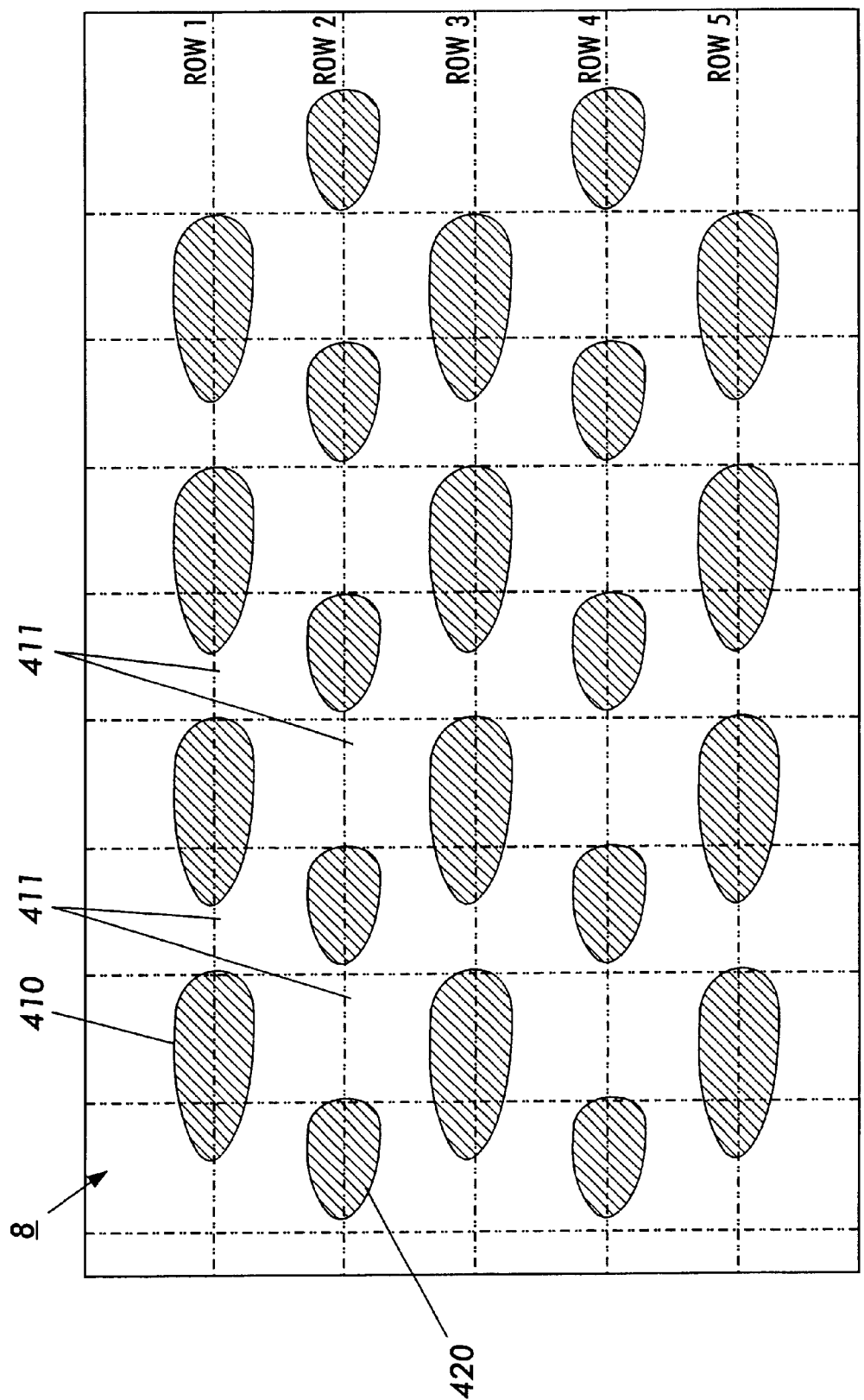
FIG. 6 is a portion of an exemplary image formed on a receiving member, and demonstrates banding.

FIG. 6 shows a recording medium 8 having a series of spot patterns 410 and 420 formed on the recording medium 8 in a "checker-board" pattern. For illustration purposes only, a swath having only a single spot is shown. However, it is to be understood that generally print heads produce a swath path that is several (300–600) spots in height. The checker-board pattern has a pixel distribution where every other pixel in a row has an ink spot, and every other row is offset from an adjacent row by one pixel. For example, row 1 in FIG. 6 shows a spot pattern 410 neighbored by at least one white spot 411, into which an ink droplet has not been ejected. As shown in FIG. 6, the pattern includes rows 1, 3 and 5 formed by a print head 4 moving in the left-to-right direction. The checker-board pattern also includes rows 2 and 4 formed by a print head 4 moving in the right-to-left direction.

As shown in FIG. 6, when the print head 4 is traveling in the left-to-right direction to form rows 1, 3 and 5, the spot patterns 410 formed at each pixel position are extended, or elongated. In contrast, the spot patterns 420, formed by the print head 4 moving in the right-to-left direction when forming rows 2 and 4, are compressed.

Figure 7:
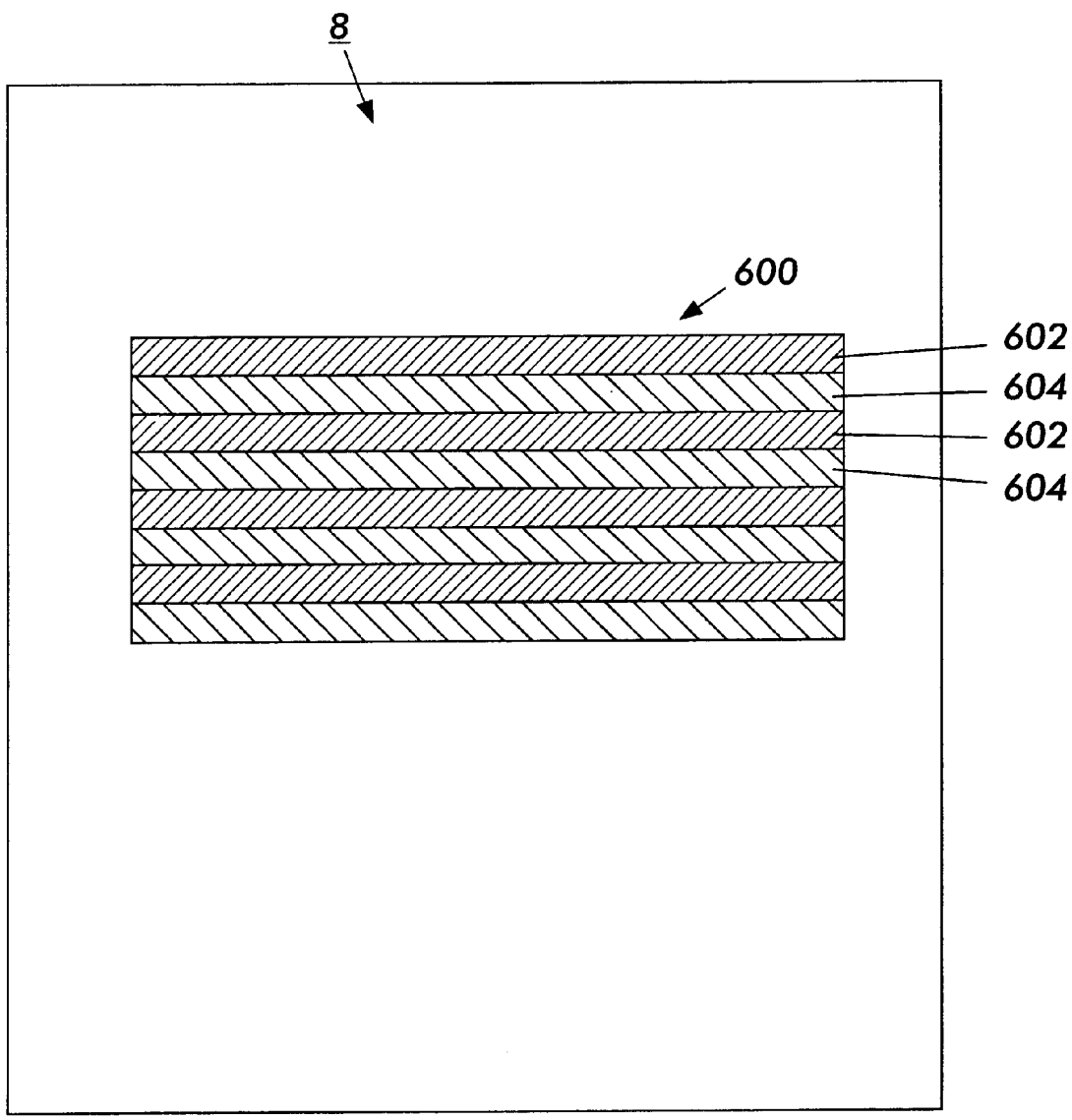
FIG. 7 is an exemplary image formed on a receiving member having a banding pattern.

The aggregate effect of the directional distortion of the spot patterns 410 and 420 is shown in FIG. 7. FIG. 7 illustrates the banding effect that occurs in an image 600 due to the directionally distorted spot patterns 410 and 420 formed on the recording medium 8. In FIG. 7, the swaths 602 formed by the print head 4 moving in the left-to-right direction appears slightly different (darker) than the swaths 604 formed by the print head 4 moving in the right-to-left direction. The swaths 602 formed by spot patterns 410 appear darker than the swaths 604 formed by spot patterns 420 because spot patterns 410 cover more area of the medium 8. This distortion effect is commonly referred to as banding because the final image 600 formed on the recording medium 8 appears to be formed by a series of differing horizontal bands 602 and 604.

Figure 8:
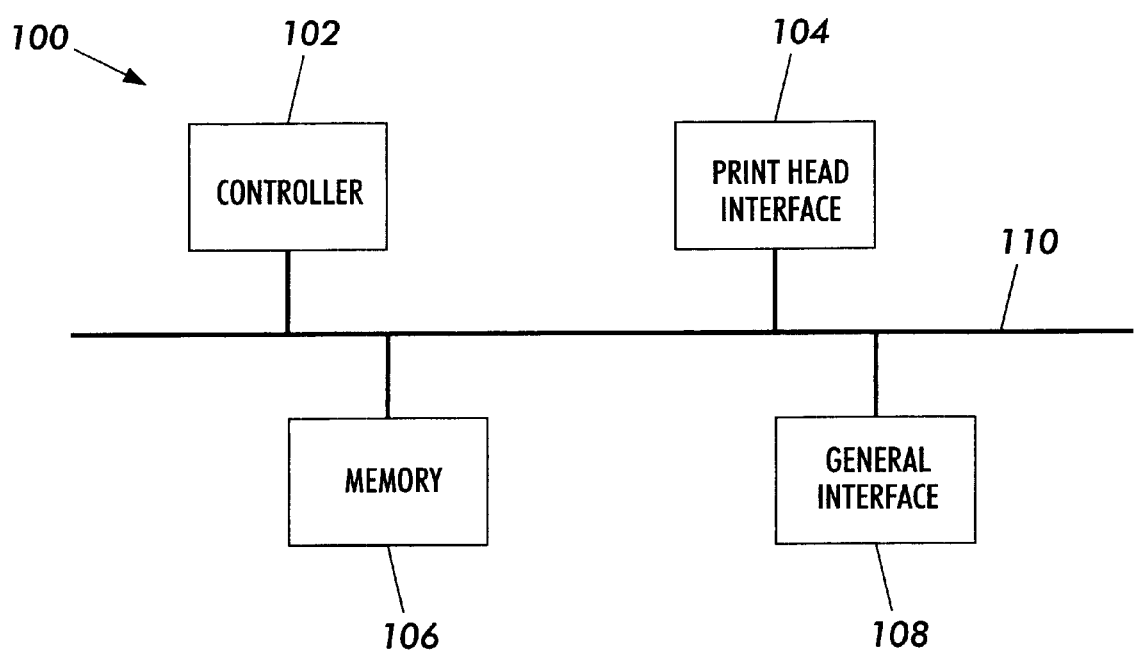
FIG. 8 is an exemplary block diagram of the print controller of the FIG. 1 embodiment of the invention.

FIG. 8 is a block diagram of one exemplary embodiment of the printer controller 100. The printer controller 100 includes a controller 102, a print head interface 104, a memory 106, and a general interface 108, connected together by a control/signal bus 110. The memory 106 stores a plurality of masks. At least a first set of masks are for use in a first swath direction (e.g., left-to-right) and a second set of masks are for use in a second swath direction (e.g., right-to-left). In operation, the controller 102 communicates with the print head 4 and the printer motors 10 and 28 through the print head interface 104 and the general interface 108, respectively, to create an image from image data received from a data source (not shown).

In accordance with this invention, the method and apparatus for preventing satellite induced banding in bidirectional printing is performed by selectively removing pixels in a first printing direction where the image is darker, and/or selectively adding pixels in a second printing direction where the image is lighter. In particular, before an image 600 is printed, an algorithm is applied to image data to selectively remove and/or selectively add pixels from/to the image data. Preferably, the algorithm selectively removes pixels and/or selectively adds pixels in midtone ranges where a main drop ejected from a nozzle 34 of the print head 4 is not neighbored by another main drop on at least one of its sides, such as illustrated by the white spots 411 in FIG. 6.

Preferably, the algorithm discriminates between whether selective removal and/or selective addition of pixels is required. The algorithm should not affect every portion of an image. For example, no removal or addition is needed for a solid area (i.e., no candidate pixel is determined) because a satellite drop extending from one main drop will land on top of a neighboring spot where another main drop is located such that there is no darkness difference in the two printing directions. Spots that have no neighbors, or white spots 411, where a satellite drop extends farther from the main drop, contribute to the density difference in bi-directional banding because the satellite drop extends from the main drop to add area coverage.

According to one embodiment of the invention, two types of algorithms are provided: a left edge algorithm and a right edge algorithm. The left edge algorithm is applied where a spot pattern ejected from the print head 4 in a left-to-right (LR) swath is lighter than a spot pattern ejected from the print head 4 in a right-to-left (RL) swath. Alternatively, a right edge algorithm is applied to the print head 4 where a spot pattern ejected from the print head 4 in a left-to-right (LR) swath is darker than a spot pattern ejected from the print head 4 in a right-to-left (RL) swath. See, e.g., spot pattern 410 in FIG. 6.

The left edge algorithm is applied where the left-to-right (LR) swath is lighter than the right-to-left (RL) because density differences are caused by satellite drops extending out more to the left of the main drop. The density difference is corrected by applying the left edge algorithm in at least one of the following two methods. According to a first method, pixels in which a spot pattern is scheduled to be ejected, are selectively removed in a darker right-to-left (RL) swath. Candidate pixels to be removed are determined and at least one of the pixels is selectively removed. A candidate pixel is chosen from at least one main drop neighbored to the left by a white spot 411, or location where a main drop will not be ejected. According to a second method, pixels are selectively added to a left edge of at least one spot pattern in the lighter left-to-right (LR) swath. Candidate pixels to be added are determined and at least one pixel is selectively added. A candidate pixel is chosen adjacent to at least one main drop that is neighbored to the left by a white spot 411, or location where a main drop has not been ejected.

In the alternative, the right edge algorithm is applied where the left-to-right (LR) swath is darker than the right-to-left (RL) swath because density differences are caused by satellite drops extending more out to the right of a main drop. By way of illustration, reversing the spot patterns shown in FIG. 6 illustrates one situation where the right edge algorithm can be applied. The density difference is corrected by applying the right edge algorithm in at least one of the following two methods. According to a first method, pixels are selectively added to white spots 411 located to the right of at least one main drop in the lighter right-to-left (RL) swath. Candidate pixels to be added are determined and at least one of the pixels is selectively added. A candidate pixel is at least one pixel chosen adjacent to at least one main drop that is neighbored to the right by a white spot 411, or pixel location where a main drop has not been ejected. According to a second method, pixels in which a spot pattern is scheduled to be ejected, are selectively removed from the right edge of the darker left-to-right (LR) swath. Candidate pixels to be removed are determined and at least one of the pixels is selectively removed. A candidate pixel is chosen from at least one main drop neighbored to the right by a white spot 411, or location where a main drop will not be ejected.

Another aspect of the invention is to selectively control the amount of pixels, or predetermined percentage that is applied to the pixel removal and pixel addition to the left edge algorithm and the right edge algorithm.

After an appropriate left edge algorithm or right edge algorithm has been determined, the controller 100 applies the algorithm to the image data that is to be sent to the print head 4 to compensate for satellite induced banding during printing.

Figure 9:
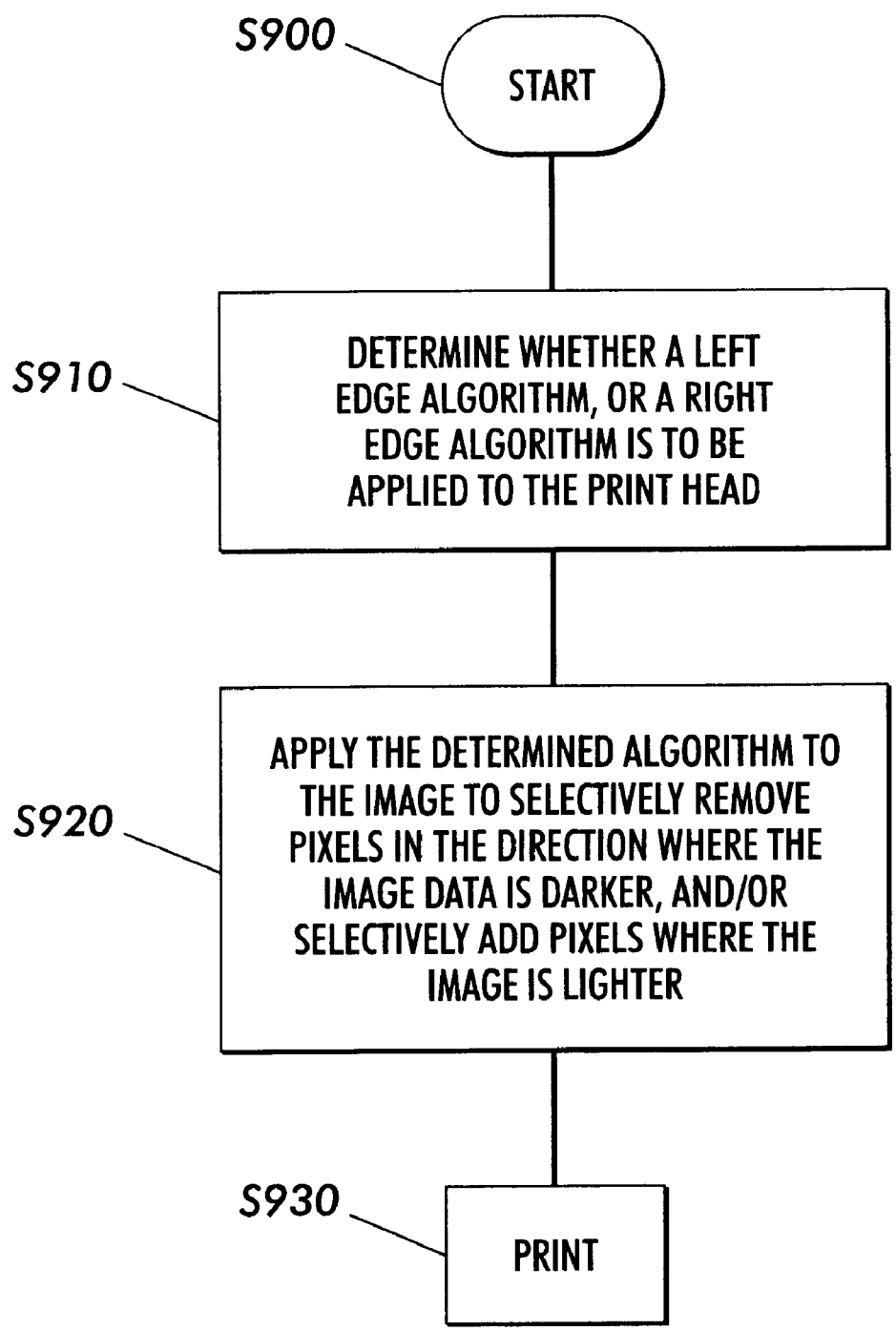
FIG. 9 is a flowchart of an exemplary process of preventing satellite induced banding according to an embodiment of the invention.

FIG. 9 is a high-level flowchart outlining one exemplary embodiment of a method for reducing satellite-induced banding in bi-directional printing by selectively removing pixels in the printing direction where the image is darker and/or selectively adding pixels in the printing direction where the image is lighter in accordance with the invention. In step S900, the control routine begins. The control routine continues to step S910.

In step S910, it is determined whether to apply a left edge algorithm or a right edge algorithm to the print head. Various exemplary modes for determining whether to apply a left edge algorithm or a right edge algorithm are possible and will be described later in more detail.

After at least one of a left edge algorithm and/or a right edge algorithm is selected, the control routine continues to step S920.

In step S920, the control routine applies at least one mask corresponding to a selected algorithm to the image data. If a left edge algorithm is determined to be applied to the image data, then at least one mask corresponding to the left edge algorithm is used to perform at least one of the following operations: (i) selectively remove pixels in a right-to-left (RL) swath direction where the image is darker and (ii) selectively add pixels in the left-to-right (LR) swath direction where the image is lighter. Alternatively, if a right edge algorithm is determined to be applied to the image data, then at least one mask corresponding to the right edge algorithm is used to selectively remove pixels in a left-to-right (LR) swath direction where the image is darker, and/or selectively add pixels in the right-to-left (RL) swath direction where the image is lighter. After at least one of the left edge algorithm and the right edge algorithm has been applied to the image data, the control routine continues to step S930.

In step S930, the print head prints the image in accordance with the instructions from at least one of the left edge algorithm and the left edge algorithm.

Referring again in more detail to step S910 in FIG. 9, various exemplary modes for determining whether to apply a left edge algorithm or a right edge algorithm are possible. According to one example, determination as to whether to apply a left edge algorithm or a right edge algorithm is based on sampling a plurality of filters applied to an image.

According to this example, a filter is chosen to minimize satellite induced banding in at least one of a right-to-left (RL) swath direction and a left-to-right (LR) swath direction. Each filter corresponds to one or more masks. In particular, a mask is a template that corrects image data by removing selected pixels and/or adding selected pixels to an image. If a left edge of a main drop requires correction by a left edge algorithm because satellite drops extend to the left of the main drop, a first mask can be applied to the image data to remove at least one pixel. In the alternative, or in addition to the first mask, a second mask can be applied to the image data to add at least one pixel in a printing direction.

Alternatively, if a right edge of a main drop requires correction by a right edge algorithm because satellite drops extend to the right of the main drop, a first mask can be applied to the image to remove at least one pixel. In the alternative, or in addition to the first mask, a second mask can be applied to the image to add at least one pixel.

A filter can be chosen in a variety of different ways according to this invention. The filter can be selected at the point where the print head is manufactured based on an average satellite drop misplacement of a particular print head design. For example, if a print head design is known, on average, to position a satellite drop slightly to the left of a main drop, then a filter can be selected to counteract the placement for all printers using this print head 4.

Alternatively, the filter may be selected using a trial and error method for each individual print head 4. This may either be done by the manufacturer of the print head or by the user of the ink jet printer that includes the print head 4. If it is done by the manufacturer, then the print head 4 may be tested to see where the nozzles 34 are placing the satellite drops in relation to the main drop. Once the satellite drop placement is known, the manufacturer may select and store a corresponding filter in memory 106 to counteract the satellite misplacement while the print head 4 is operating.

Alternatively, a user may select a filter by a trial and error process during the printing of images or during a set-up procedure. In this case, the user may sample a plurality of different filters while printing a series of images from one original image, and select the filter which produces the best image, i.e., the image having the least amount of banding.

In this exemplary embodiment, a user selects a filter by a trial and error process in response to sampling light tone images of an original image. Eight filters (listed below) are sampled to determine whether to apply a left edge algorithm or a right edge algorithm to image data to reduce the satellite-induced banding in a bi-directional printer. Each of the eight filters corresponds to eight separate light tone test images (approximately 25% AC (area coverage). In each filter, at least one mask is applied to at least one of a right-to-left (RL) swath or a left-to-right (LR) swath. When a larger adjustment is required to reduce satellite induced banding, more then one mask can be applied, such as for example, by applying a first mask to the right-to-left (RL) swath and applying a second mask to the left-to-right (LR) swath. See, e.g., filters 2–4 and 6–8 listed below.

According to this example, the following eight filters are applied to image data and eight sample images are produced.

1. Apply 3% left edge removal to the RL swath.
2. Apply 3% left edge removal to the RL swath and 3% left edge addition to the LR swath.
3. Apply 6% left edge removal to the RL swath and 3% left edge addition to the LR swath.
4. Apply 6% left edge removal to the RL swath and 6% left edge addition to the LR swath.
5. Apply 3% right edge removal to the LR swath.
6. Apply 3% right edge removal to the LR swath and 3% right edge addition to the RL swath.
7. Apply 6% right edge removal to the LR swath and 3% right edge addition to the RL swath.
8. Apply 6% right edge removal to the LR swath and 6% right edge addition to the RL swath.

According to this example, the eight light tone sample images give a ±12% area coverage difference between the LR and the RL swaths. Area coverage is not limited to a ±12% area coverage and can be varied based on the number of bits in a register and the number of registers used. These filters are based on a 32 bit register, such that the removal or addition of 1 pixel equals 3% removal or addition. In accordance with the invention, bit registers can include any number of bits, including 4 bit, 6 bit, 8 bit, 16 bit, 32 bit, 64 bit or any other number of bits in at least one register.

In this example, sample images 1–4 illustrate the application of a left edge algorithm, whereas sample images 5–8 illustrate the application of a right edge algorithm.

After each of the light tone sample images are created from the image data, the sample which produces the best image, i.e., the image having the least amount of banding, is selected.

In this example, suppose filter 1 produced the best image. Filter 1 employs a mask that applies a 3% left edge removal to the right-to-left (RL) swath. A preferred 3% mask can be realized by turning every pixel but the first pixel on in a 32 bit register. This mask is applied to the full raster. For each subsequent swath, the mask should be shifted to the left by 5 pixels to prevent visible (vertical) lines from being produced.

According to another aspect of the invention, various exemplary masks can be applied to at least one of the left edge algorithm or the right edge algorithm. In memory 106, a first set of masks can be stored to correct satellite drop misplacement in a first printing direction and a second set of masks can be stored to correct satellite drop misplacement in a second printing direction. Alternatively, and to reduce the amount of memory space required, it is also possible to interchange the first set of masks for use in a first printing direction with the second set of masks for use in a second printing direction. For example, a left edge mask can be used as a right edge mask by inverting the first mask and applying the inverted mask in a second printing direction.

Furthermore, a mask can selectively permit the printing of every pixel except for a predetermined number of pixels of a bit register. For example, if a sample filter having a 6% removal is chosen to produce the best image, e.g., as provided by filter 3 or filter 4, then the preferred mask will first apply a 6% left edge removal to the RL swath before subsequently applying a left edge addition. A preferred 6% mask can be realized by turning every pixel but the first and the seventeenth pixel on in a 32 bit register and shifting to the left by 5 pixels for each raster. The mask is applied to the full raster. By shifting the mask in subsequent rasters, lines are prevented from being visibly printed in the image and the removed pixels blend in such that the selectively removed and/or selectively added pixels are not readily apparent to the naked eye. In accordance with this invention, the masks are uniform and have a lower tendency to form lines in any given direction.

After an appropriate algorithm and at least one corresponding mask has been determined, the next step is to apply the algorithm to the original image data. For exemplary purposes only, suppose a left edge algorithm according to filter 1 was determined to produce the best image. The next step would be to determine a left edge bit map. The left edge bit map is given by the logical AND of the original bit map and the original bit map inverted and shifted to the right by 1 pixel.

Thereafter, a density difference is corrected based on the left edge algorithm in at least one of the following two methods.

According to a first method, pixels are removed in a first printing direction having a darker swath. This is done by first determining which candidate pixels are to be removed. Candidate pixels are determined by: computing a result for a logical AND of the mask and the left edge bit map, inverting the result and logically AND the inverted result and the original image. If all the pixels in the original image are isolated (i.e., they have neighbors that are white spots 411), the percentage of pixels removed is equal to that of the mask. If the original image is a solid area, no pixels will be removed. If all of the pixels are not isolated and the original image is not a solid area, then the percentage of pixels removed will be between zero and the mask value.

According to a second method, pixels are added in a second printing direction a lighter swath. This is done by determining which pixels are to be added. These pixels are determined by: computing a result of the logical AND of the mask and the left edge bit map; shifting the result to the left by 1 pixel; and logically OR the result and the original image. If all the pixels in the original image are isolated, the percentage of pixels added is equal to that of the mask. If the original image is a solid area, no pixels will be added. If all of the pixels are not isolated and the original image is not a solid area, then the percentage of pixels removed will be between zero and the mark value.

Various exemplary methods for computing the application of the left edge algorithm or the right edge algorithm can be applied including, but not limited to, logical computations, manual calculations, and any other method for computing values.

Figure 10A:
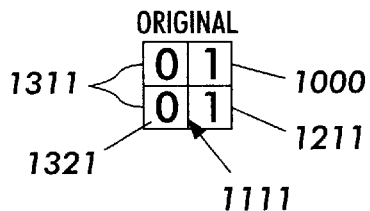
FIGS. 10A–10D illustrate applying an exemplary left edge algorithm to selectively remove pixels in a printing direction in order to lighten an image in accordance with an embodiment of the invention.
Figure 10B:
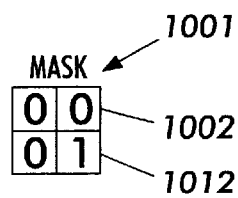

FIGS. 10A–10D illustrate one exemplary embodiment of a left edge algorithm applied to selectively remove pixels in a printing direction in order to lighten an image according to the invention. In this example, FIG. 10A illustrates image data as an original bit map 1000 having a left edge 1111 neighbored by at least one pixel 1311 to the left into which at least one main drop has not been ejected (indicated by "0"). The original bit map 1000 is represented as a 2×2 bit map. Suppose, e.g., that after a plurality of light tone images are sampled, a filter 1001 is selected that corresponds to a left edge removal filter and a mask 1002 is determined to render the best image. FIG. 10B shows a mask 1002 that selects pixels 1012 for a left edge removal (indicated by "1" to the lower-right corner of the mask). That is, in the right-to-left (RL) direction the swath appears to be darker because the left edge of the main drop is elongated. The left edge appears longer because satellite drops have landed to the left of the main drop thereby elongating the left edge of the main drop. See, e.g., row 1 in FIG. 6.

Figure 10C:
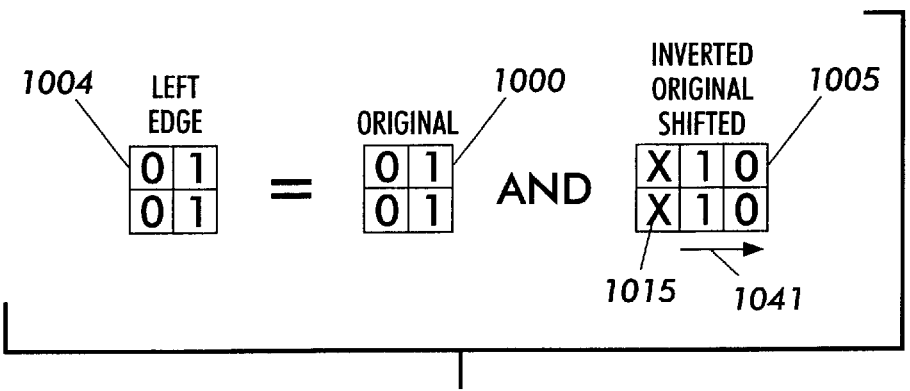

In accordance with the invention, to determine which candidate pixels are to be removed, the following steps are taken by the printer controller 100. FIG. 10C illustrates the determination of a left edge bit map 1004. The left edge bit map 1004 is determined by the logical AND of: the original bit map 1000 and an inverted original bit map 1005 shifted 1041 by a predetermined number of pixels, e.g., "1 pixel". "X" 1015 in represents an unknown pixel element.

Figure 10D:
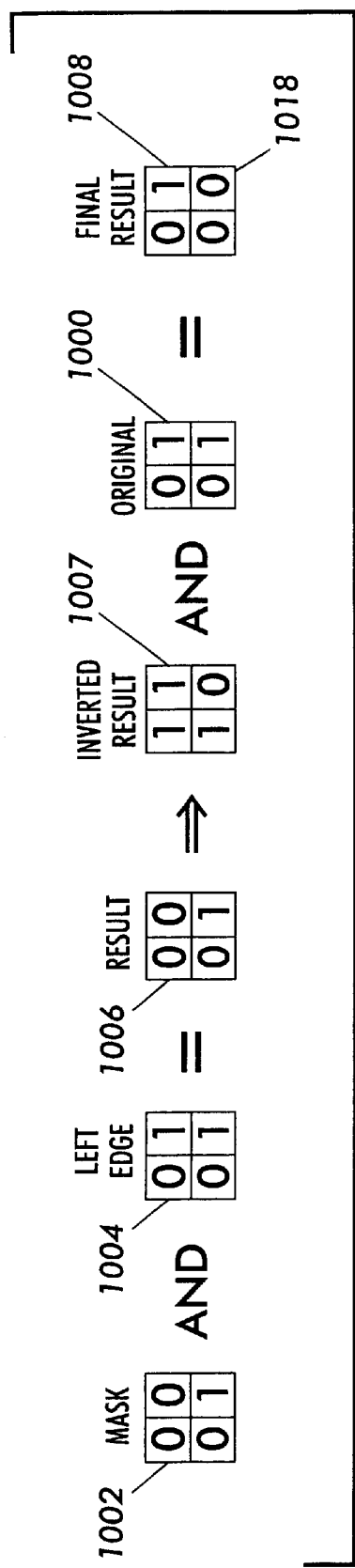

In FIG. 10D, the number of candidate pixels to be determined is obtained by: obtaining a result 1006 by performing a logical AND of: the mask 1002 and the left edge bit map 1004; inverting the result 1006 to render an inverted result 1007 and performing a logical AND on the inverted result 1007 and the original bitmap 1000 to render a final result 1008. In the final result 1008, the candidate pixel 1018 is determined to be removed. Candidate pixel 1018 corresponds to the lower-right pixel 1211 in the original image 1000 bit map and matches the selected pixel 1012 in the lower right pixel position in the mask 1002 that has been designated for removal. In other words, the lower-right pixel is designated as being removed by turning off, or designating as "0."

Figure 11A:
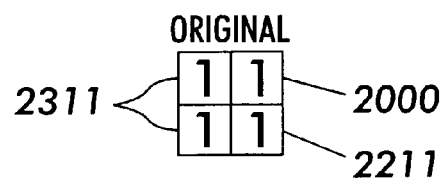
FIGS. 11A–11C illustrates applying an exemplary left edge algorithm where no pixels are to be removed in accordance with an embodiment of the invention.
Figure 11B:
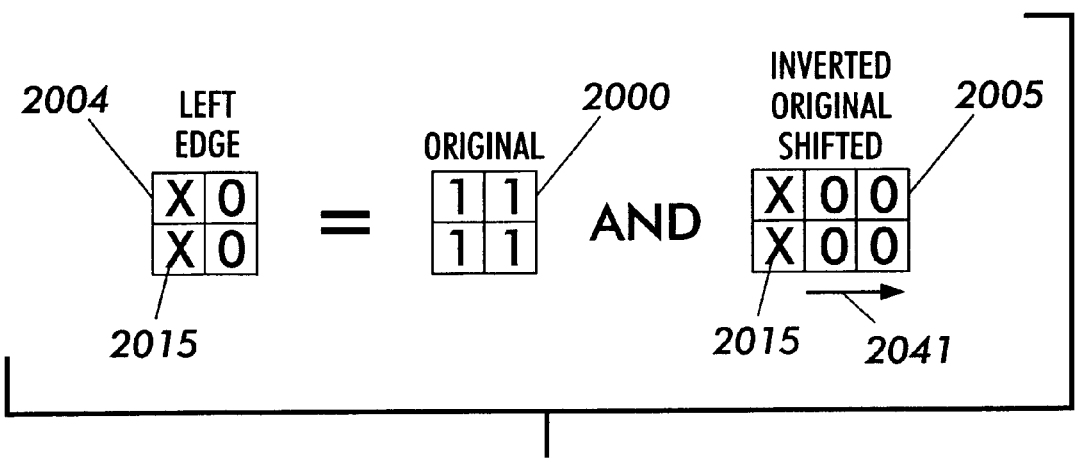
Figure 11C:
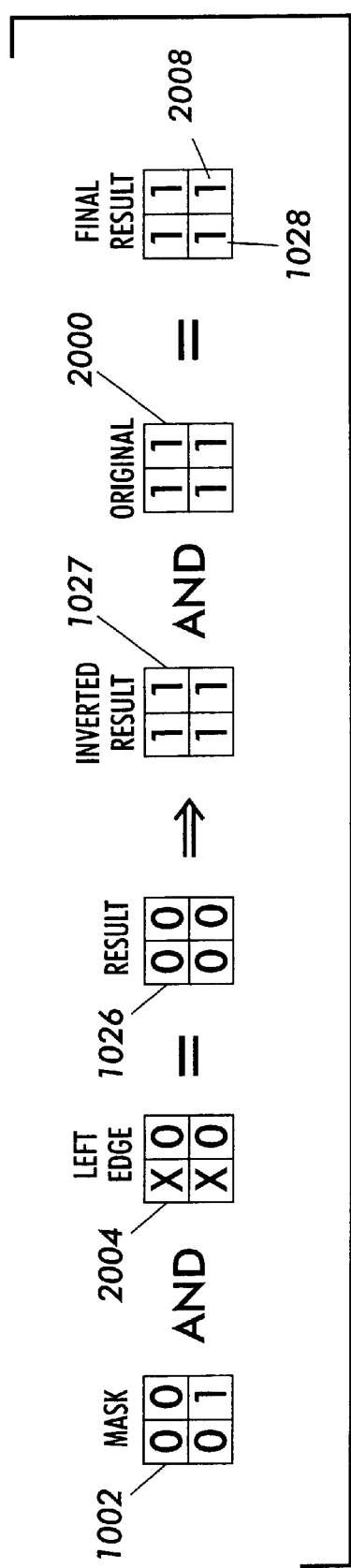

FIGS. 11A–11C illustrate an example where application of the algorithm results in no selective pixel compensation, such as for example, in image areas that are solid, or where there are no neighboring white spots. A left edge pixel removal or addition will not be performed when a main drop is neighbored to the left by an adjacent main drop. FIG. 11A illustrates image data as an original bit map 2000 that represents a solid image. Suppose, e.g., that after a plurality of light tone images are sampled, a mask 1002 for a left edge filter 1001 (similar to FIG. 10B) is also determined to render the best image. FIG. 10B shows a mask 1002 that selects pixel 1012 for a left edge removal (indicated by "1" to the lower-right corner of the mask 1002). Pixel 1012 corresponds to pixel 2211 in the original image 2000, as shown in FIG. 1A. Pixel 2211 is bordered to the left by pixel 2311.

In accordance with the invention, to determine which candidate pixels are to be removed, the following steps are taken by the printer controller 100. FIG. 11B illustrates the determination of a left edge bit map 2004. The left edge bit map 2004 is determined by the logical AND of: the original bit map 2000 and an inverted original bit map 2005 shifted 2041 by a predetermined number of pixels, e.g., "1 pixel". "X" 2015 in represents an unknown pixel element.

In FIG. 11C, candidate pixels to be removed are determined. The number of candidate pixels to be determined is calculated by: obtaining a result 1026 by performing a logical AND of: the mask 1002 and the left edge bit map 2004; inverting the result 1026 to render an inverted result 1027; and performing a logical AND on the inverted result 1027 and the original bitmap 2000 to render a final result 1028. In the final result 1028, no candidate pixel have been determined to be removed from the original 2×2 bit map. In other words, pixel 2008 which corresponds to pixel 1012 in mask 1002 is not designated as being turned off, or "0." Thus, since pixel 2211 in the original image 2000 has an adjacent pixel 2311 no pixels in the original image 2000 will be removed.

Figure 12:
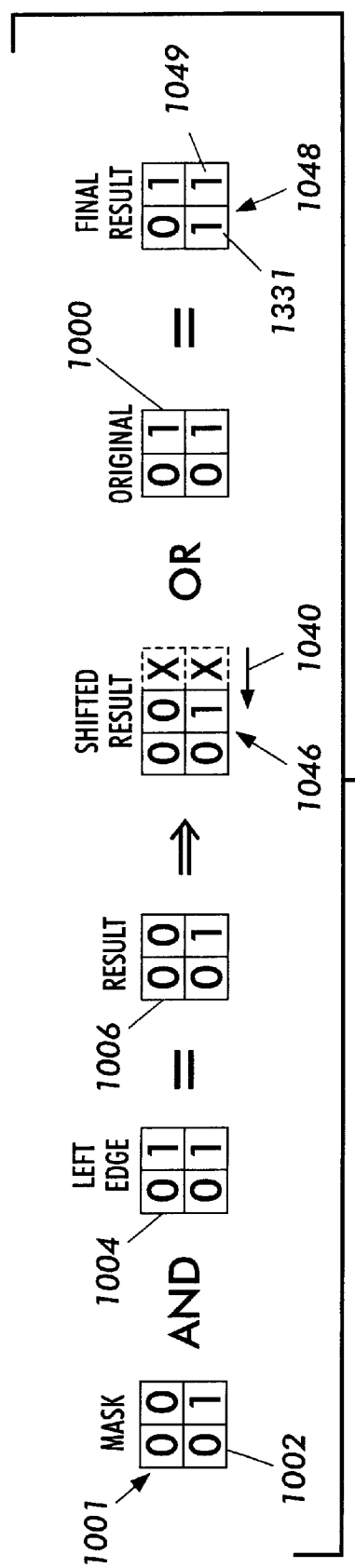
FIG. 12 illustrates applying an exemplary left edge algorithm to selectively add pixels in a printing direction in order to darken an image.

FIG. 12 illustrates applying a left edge algorithm to selectively add pixels in a printing direction in order to darken an image. In this example, the original bit map 1000 is the same as shown in FIG. 10A. For exemplary purposes, suppose for example that after a plurality of light tone images are sampled, a mask 1002 for a left edge addition filter is determined to render the best image. Accordingly, the mask 1002 of FIG. 10B also applies to this example. Likewise, the left edge bit map 1004 of FIG. 10C is also determined to be the same.

In the left-to-right (LR) direction, the swath appears to be lighter because satellite drops 57 do not fall beyond the left edge of the main drop. See, e.g., the spot pattern 420 in FIG. 6. The spot pattern 420 in row 2 of FIG. 6 appears shorter than the spot pattern 410 in row 1 because satellite drops 57 land in a position closer to, and even on top of, the main drop.

FIG. 12 illustrates the determination of the pixels to be added according to an aspect of the invention. To determine which candidate pixels are to be added, the following steps are taken by the printer controller 100. The candidate pixels to be added are computed by: obtaining a result 1006 by performing a logical AND of: the mask 1002 and the left edge bit map 1004; shifting 1040 the result 1006 to the left a predetermined number of pixels to render a shifted result 1046, e.g., by 1 pixel; and performing a logical OR on the shifted result 1046 and the original bitmap 1000 to render a final result 1048. In the final result 1048, a candidate pixel 1331 that neighbors pixel 1049 has been determined to be added into the lower-left pixel position adjacent to pixel 1049. Pixel 1331 corresponds to pixel 1211 in the original bit map 1000. In other words, a main drop is determined to be selectively added adjacent to the lower-left pixel 1321 in the original bit map 1000 and is designated as being added by turning on, or designating as "1."

Various exemplary embodiments of this invention are possible. According to another aspect of this invention, a right edge algorithm can be applied to the situation where a left-to-right (LR) swath is darker than a right-to-left (RL) swath, i.e., satellites drops extend out more on the right side of the main spots in a manner. The computation for determining candidate pixels for selective removal in a first printing direction and selective addition in a second direction can be similarly derived in accordance with the example provided in FIGS. 10A–10D, 11A–11B and 12A.

The examples described above are offered for exemplary purposes only and are not intended to limit the scope of the invention.

Various advantages are obtained by this invention including, but not limited to, correcting area coverage differences as small as 3%, applying different corrections to different print heads, applying different corrections to different color planes, and improving minimum correction to less than 3% by using 2 or more registers, e.g., by using 2 or more 32 bit mask registers.

As shown in FIG. 9, the printer controller 100 and print head interface 104 are preferably implemented using an application specific integrated circuit (ASIC). However, they can also be implemented using any other known or later developed integrated circuit, such as a micro-processor, a micro-controller, a digital signal processor, a hardwired electronic or logic circuit such as a discrete element circuit, a programmable logic device such as a PLD, PLA, FPGA or PAL, or the like. In general, any integrated circuit or logic device capable of implementing a finite state machine that is in turn capable of implementing the flowchart shown in FIG. 9, can be used to implement the printer controller 100.

The preferred implementation of the invention is effective to add and/or delete pixels from areas having mid-tone coverage while automatically not affecting areas that are solid. The invention also could be implemented such that the algorithm is only applied to image data in the mid-tone range and is not applied to dark areas (where there are no neighboring white pixels).

While the systems and methods of this invention have been described in conjunction with the specific embodiments outlined above, it is evident that many alternatives, modifications and variations will be apparent to the those skilled in the art. Accordingly, the exemplary embodiments of the systems and methods of this invention, as set forth above, are intended to be illustrative, not limiting. Various changes may be made without departing from the spirit and scope of the invention.

What is claimed is:

1. An ink jet printer that prevents satellite induced banding in bi-directional printing in which a print head alternatively moves in a first printing direction and in a second printing direction opposite to the first printing direction, the ink jet printer comprising a controller that:
    performs at least one of (i) selectively removing pixels in the first printing direction in order to lighten an image, and (ii) selectively adding pixels in the second printing direction in order to darken the image.

2. The ink jet printer according to claim 1, wherein the pixels that are selectively removed are removed from pixel locations that have a neighboring pixel location into which a main drop has not been ejected, and into which a satellite drop of the pixel has extended.

3. The ink jet printer according to claim 1, wherein the pixels that are selectively added are added into a drop-less neighboring pixel location disposed adjacent to a pixel location into which a main drop has been ejected.

4. The ink jet printer according to claim 1, wherein the controller applies a left edge algorithm where a left-to-right (LR) swath is lighter than a right-to-left (RL) swath.

5. The ink jet printer according to claim 1, wherein the controller applies a right edge algorithm where a left-to-right (LR) swath is darker than a right-to-left (RL) swath.

6. The ink jet printer according to claim 1, wherein the controller shifts positions of the pixels that are removed or added for different swaths of the print head.

7. The ink jet printer according to claim 1, wherein the controller performs the removing and the adding of pixels by applying at least one mask to image data supplied to the ink jet printer.

8. The ink jet printer according to claim 7, wherein the controller applies the at least one mask to the image data such that pixels will not be removed or added to solid image areas.

9. The ink jet printer according to claim 7, further comprising a memory that stores a plurality of the masks, each of the stored masks performs at least one of removing and adding different amounts of pixels, and wherein the controller selects one of the plurality of masks based upon an input selection signal.

10. The ink jet printer according to claim 9, wherein the selection signal is input by a user of the ink jet printer.

11. The ink jet printer according to claim 7, wherein the controller removes pixels from a left edge of a darker (right-to-left) swath by applying a left edge algorithm that:
   selects a filter including at least one mask;
   determines a left edge by performing the logical AND of:
      an original bit map, and an inverted original bit map shifted to the right by one pixel; and
   determines candidate pixels to be removed by:
      obtaining a result by performing a logical AND of: the mask and the left edge;
      inverting the result; and
      performing a logical AND of: the inverted result and the original bitmap.

12. The ink jet printer according to claim 7, wherein the controller adds pixels to a left edge of a lighter (left-to-right) swath by applying a left edge algorithm that:
   selects a filter including at least one mask;
   determines a left edge by performing the logical AND of:
      an original bit map, and an inverted original bit map shifted to the right by one pixel; and
   determines candidate pixels to be added by:
      obtaining a result by performing a logical AND of: the mask and the left edge;
      shifting the result to the left by a predetermined number of pixels; and
      performing a logical OR of: the result shifted to the left by the predetermined number of pixels, and the original bit map.

13. The ink jet printer according to claim 7, wherein the controller removes pixels from a right edge of a darker (left-to-right) swath by applying a right edge algorithm that:
   selects a filter including at least one mask;
   determines a right edge by performing the logical AND of: an original bit map, and an inverted original bit map shifted to the left by one pixel; and
   determines candidate pixels to be removed by:
      obtaining a result by performing a logical AND of: the mask and the right edge;
      inverting the result; and
      performing a logical AND of: the inverted result and the original bitmap.

14. The ink jet printer according to claim 7, wherein the controller adds pixels to a right edge of a lighter (right-to-left) swath by applying a right edge algorithm that:
   selects a filter including at least one mask;
   determines a right edge by performing the logical AND of: an original bit map, and an inverted original bit map shifted to the left by one pixel; and
   determines candidate pixels to be added by:
      obtaining a result by performing a logical AND of: the mask and the right edge;
      shifting the result to the right by a predetermined number of pixels; and
      performing a logical OR of: the result shifted to the right by the predetermined number of pixels, and the original bit map.

15. A method of preventing satellite induced banding in bi-directional printing in which a print head alternatively moves in a first printing direction and in a second printing direction opposite to the first printing direction, the method comprising:
   performing at least one of:
      (i) selectively removing pixels in the first printing direction in order to lighten an image, and
      (ii) selectively adding pixels in the second printing direction in order to darken the image.

16. The method according to claim 15, wherein the pixels that are selectively removed are removed from pixel locations that have a neighboring pixel location into which a main drop has not been ejected, and into which a satellite drop of the pixel has extended.

17. The method according to claim 15, wherein the pixels that are selectively added are added into a drop-less neighboring pixel location disposed adjacent to a pixel location into which a main drop has been ejected.

18. The method according to claim 15, wherein a controller applies a left edge algorithm where a left-to-right (LR) swath is lighter than a right-to-left (RL) swath.

19. The method according to claim 15, wherein a controller applies a right edge algorithm where a left-to-right (LR) swath is darker than a right-to-left (RL) swath.

20. The method according to claim 15, further comprising:
   shifting positions of the pixels that are removed or added for different swaths of the print head.

21. An ink jet printer that prevents satellite induced banding in bi-directional printing in which a print head alternatively moves in a first printing direction and in a second printing direction opposite to the first printing direction, the ink jet printer comprising:
   a memory including a first set of masks for use in the first printing direction, and a second set of masks for use in the second printing direction; and
   a controller that selects at least one of the masks to perform at least one of: (i) selectively remove pixels in the first printing direction in order to lighten an image, and (ii) selectively add pixels in the second printing direction in order to darken the image.

* * * * *